(No Model.) 2 Sheets—Sheet 2.
J. RIDDELL.
MACHINE FOR BORING OUT THE STANDARDS AND FIELD MAGNETS OF DYNAMO ELECTRIC MACHINES.
No. 508,639. Patented Nov. 14, 1893.
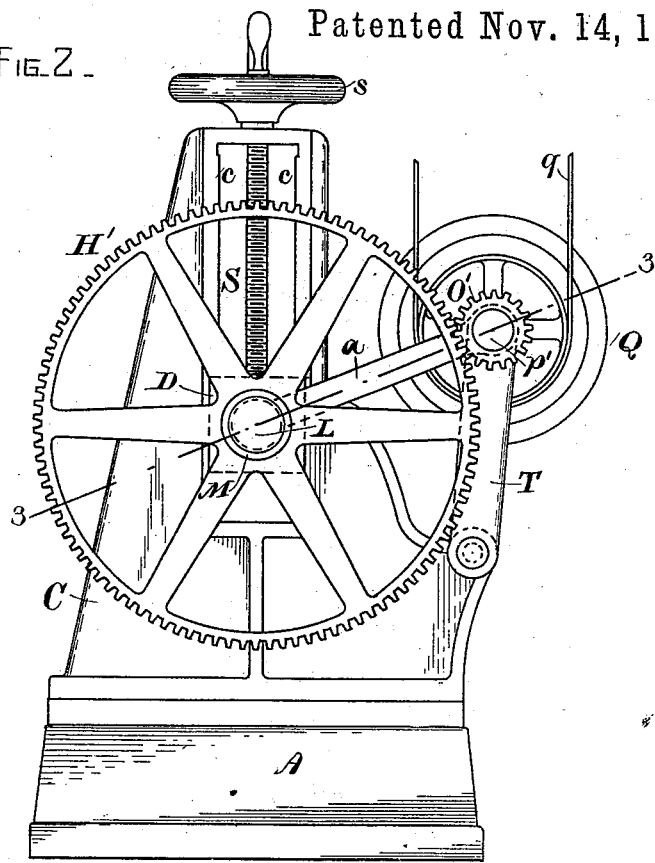
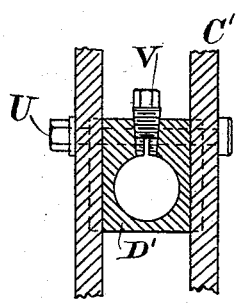
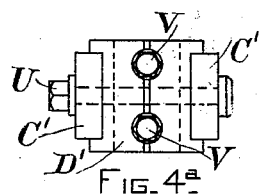
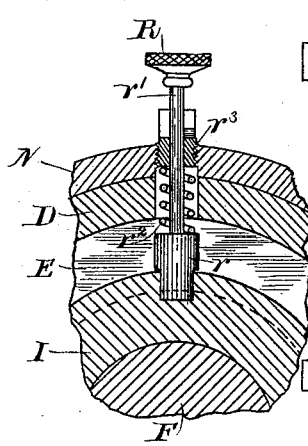
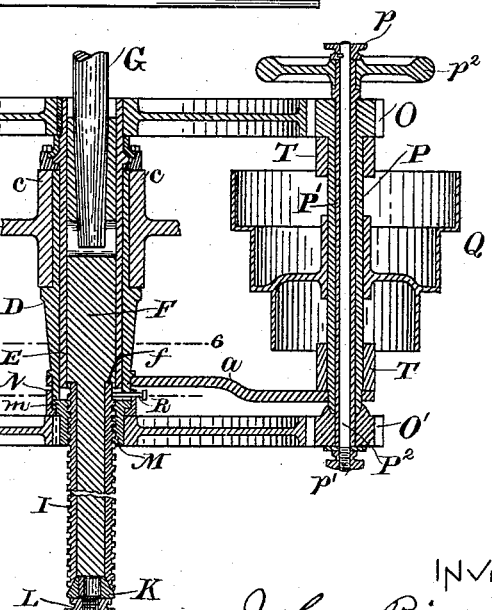
WITNESSES.
Alec F. Macdonald
A. R. Clue
INVENTOR.
John Riddell
by Bentley & Blodgett
Attys.
THE NATIONAL LITHOGRAPHING COMPANY,
WASHINGTON, D. C.

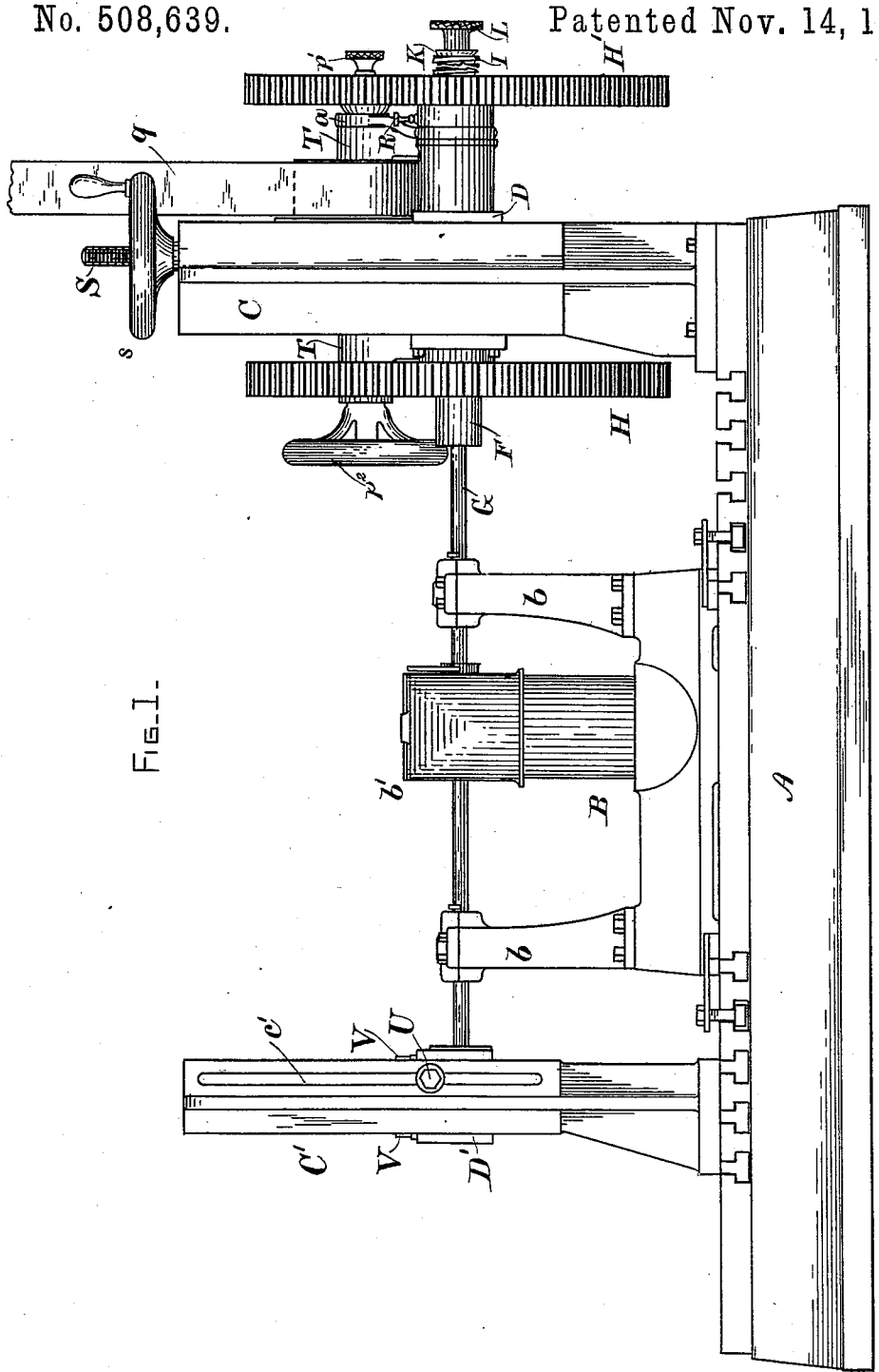

UNITED STATES PATENT OFFICE.

JOHN RIDDELL, OF SAUGUS, ASSIGNOR TO THE THOMSON-HOUSTON ELECTRIC COMPANY, OF BOSTON, MASSACHUSETTS.

MACHINE FOR BORING OUT THE STANDARDS AND FIELD-MAGNETS OF DYNAMO-ELECTRIC MACHINES.

SPECIFICATION forming part of Letters Patent No. 508,639, dated November 14, 1893.

Application filed August 26, 1892. Serial No. 444,201. (No model.)

*To all whom it may concern:*

Be it known that I, JOHN RIDDELL, a citizen of the United States, residing at Saugus, county of Essex, State of Massachusetts, have invented a certain new and useful Improvement in Machines for Boring Out the Standards and Field-Magnets of Dynamo-Electric Machines, of which the following is a specification.

My invention relates to boring machines, and its object is to enable both shaft bearings in a dynamo electric machine, or the armature space in both pole pieces, or all these portions, to be bored out at the same time and by the same boring bar or spindle, thus assuring accurate alignment of said bearings. Heretofore it has been customary to bore out each part separately at the risk of having them out of line when assembled. In my invention, I assemble the parts first, and then do the boring all at one operation.

My machine comprises a long bed to support the work and also the standard in which the boring spindle rotates. One of these standards is adjustable toward or away from the other, and the bearings for the spindle are vertically adjustable. The spindle can be fed automatically or by hand.

The invention consists in certain novel features of construction and arrangement hereinafter set forth and particularly pointed out in the claims.

In the drawings, Figure 1 is a side elevation of my invention at work. Fig. 2 is an end elevation. Fig. 3 is a section on line 3—3 Fig. 2. Fig. 4 is a section of a spindle bearing. Fig 4ª is a plan view of the same. Fig. 5 is a section through the spring bolt for locking the spindle and feed screw together, and Fig. 6 is a cross section of the hollow shaft and spindle on line 6—6 Fig. 3.

The bed plate A is provided with the usual slots for the reception of bolts to hold the work B, which as shown consists of a dynamo electric machine having standards $b$ and pole pieces $b'$. In the former are the bearings for the armature shaft, and in the latter is formed the circular space in which the armature revolves. This space and the bearings must be concentric.

To one end of the bed plate is bolted the head-block C, containing two vertical parallel jaws $c$, between which slides the block D, affording a bearing for the hollow-shaft E, inside of which is the spindle F, which has at its front end a socket for the boring bar G. The spindle is connected with the hollow-shaft by a spline and groove, which permits the spindle to slide axially in the hollow shaft but compels the two to revolve together.

Keyed to the front of the hollow shaft is a spur gear H. The rear end of the spindle projects beyond the end of the hollow shaft, and is preferably reduced in diameter. Loosely sleeved on this end of the spindle is the hollow feed screw I. The rear end of the screw is conically counter-bored, to receive a friction cone K splined on the end of the spindle. By means of a nut L on a threaded neck forming an extension of the spindle, the cone can be forced against the end of the screw which has a bearing against a shoulder $f$ on the spindle. The screw is thus capable of being locked to the spindle, by tightening the nut L, or allowed to run freely thereon by slackening the nut.

Meshing into the feed screw is a nut M, which has a cylindrical flange $m$, which is engaged by an internally flanged union N secured to the end of the block D. This permits the nut to rotate freely without axial movement. The nut is received in the hub of a spur gear H', where it is firmly keyed. When the gear is revolved, it turns the nut and feeds the screw and the spindle through the hollow shaft E. The function of the gear H', therefore, is to feed the spindle and boring bar. The office of the gear H is to rotate the spindle and bar to do the boring. But it is evident that if both gears revolve at the same speed, the nut and screw will turn in unison and there will be no feeding done. To prevent this, the gears, which are driven by pinions O, O', are made with a different number of teeth, so that one gains on the other, and the screw is thus fed by a differential action. The pinion O is fast on a hollow shaft P which is sleeved on another hollow shaft P', on which is splined the pinion O'. The end of the shaft P is coned to enter a conical recess in the pinion O'. A rod P² runs through the shaft P', and carries at one end a fixed knob $p$, and at the other a nut $p'$ bearing against the face of the pinion O'. When said nut is tightened, either by turning the nut or the knob $p$, the pinion O' is clamped against the end of the hollow shaft P, and both pinions revolve together. A coned pulley Q is secured on the outer shaft P, and power is conveyed to it by a belt $q$. When the nut $p'$ is slackened, the shaft P' is free to revolve independently of the shaft P. A hand wheel $p^2$ enables the shaft P' and pinion O' to be turned by hand, when it is desired to feed the spindle rapidly. In this case, a spring bolt R, mounted in a hole in the bearing block D, is allowed to engage with a longitudinal groove in the screw I to keep it from turning when the nut M is revolved. When the hand feed is being used, and this bolt is down, the nut $p'$ must be slackened, and if the belt is running, the nut L must also be loose, to permit the spindle to revolve in the screw.

The bolt may be of any suitable construction, but I prefer the one shown in Fig. 5. The nose $r$ of the bolt is flattened on opposite sides to permit it to enter the groove in the screw. The shank $r'$ is surrounded by a spring $r^2$, which is confined between the head of the bolt and a screw plug $r^3$, through which the shank passes. When lifted out of the groove and given a quarter turn the bolt stands across the groove and cannot enter it.

The block D is vertically adjustable in the jaws $c, c$, by means of a screw S and hand wheel nut $s$. In order to keep the gears and pinions in mesh when the block is moved up or down, the shaft P is journaled in the ends of a bifurcated arm T, pivoted at its lower end to the base A, and connected with the block D by a radius link $a$, whereby the distance between the centers of the gears and pinions is kept always the same.

The tail-block C' consists of two parallel jaws, each having a transverse slot $c'$. A block D' slides between the jaws, and is clamped at any desired height by a bolt U passing through the block and the slot $c'$. The block is bored to form a bearing for the boring bar G. In case of wear, or a difference in the diameter of different bars, the bearing can be adjusted, being split from the top to the central aperture, and one or more tapering screw plugs V inserted in tapped holes coinciding with the split. By turning the plugs the bearing can be pried open, or allowed to spring close together, as the case may be.

The operation of the machine is as follows: The dynamo electric machine B is secured upon the bed A, and the blocks D, D', are adjusted to the proper height, so that the boring bar G carrying the cutters will be substantially concentric with the shaft bearings in the standards $b$ and the armature space in the pole pieces $b'$. The feed screw is locked to the spindle, and the shafts P, P' are clamped together by the nut $p'$. The machine is then started, and after a cut has been taken, if it is desired to run the spindle back quickly, the belt is stopped, the nut $p'$ loosened, the bolt R shot into the groove in the feed screw and the wheel $p^2$ is turned by hand. This arrangement may also be used for rapidly feeding a reamer through the work. When boring, the feed can be instantly stopped without stopping the machine, by slackening the nut L.

What I claim as new, and desire to secure by Letters Patent, is—

1. A boring machine, consisting of a bed, a head-block and a tail-block secured thereto, bearing blocks vertically adjustable in said head and tail blocks, a spindle rotatably mounted on one of said bearing blocks, a feed screw rotatably sleeved on said spindle, means for locking the screw to the spindle, a nut engaging with said screw, and differential gearing for revolving the nut and the spindle, substantially as described.

2. In a boring machine, a head block having a vertically adjustable bearing block, a hollow shaft rotating in said bearing block, a spindle splined in said hollow shaft, a feed-screw rotatably sleeved on said spindle, means for locking the screw to the spindle, a nut engaging with the screw, and differential gearing for revolving the nut and the hollow shaft, substantially as described.

3. In a boring machine, a head block carrying a bearing block, a hollow shaft rotating in said bearing block, and provided with a spur gear, a spindle splined in said hollow shaft, a feed screw rotatably sleeved on said spindle, means for locking the screw to the spindle, a nut rotatably mounted on the end of the bearing block and engaging with the feed screw, a spur gear keyed on said nut, and pinions for rotating both of said spur gears, substantially as set forth.

4. In a boring machine, a rotatable spindle having a feed screw rotatably sleeved thereon, means for locking the screw to the spindle, a nut engaging with the screw, and differential gearing for rotating the nut and the spindle, substantially as set forth.

5. In a boring machine, a rotatable spindle having a feed screw loosely sleeved thereon, and containing a longitudinal groove, a bolt adapted to engage with said groove, a rotatable nut engaging with the screw, and means for rotating the nut, substantially as described.

6. The combination with the hollow shaft E, of the spindle F splined therein and having a reduced portion, a hollow screw I loosely sleeved on said reduced portion, a cone K entering the end of the screw, and a nut L for tightening the cone against the screw, substantially as set forth.

7. The combination with the bearing block D, of the flanged nut M, the flanged union N securing said nut to the block, a spindle rotatable in the block, and provided with a feed screw engaging with the nut, and gears for rotating the spindle and the nut, substantially as described.

8. A boring machine comprising a head block, a bearing block vertically adjustable in said head block, a spindle journaled in said bearing block, a spur gear secured to the spindle, a pinion meshing with the gear, a driving shaft carrying said pinion, a rocking arm in which said shaft is journaled, and a radius link connecting said arm with the bearing block, substantially as set forth.

9. The combination with the hollow shaft P carrying the pinion O, of the hollow shaft P' concentric with the shaft P and having the pinion O' splined thereon, the rod $P^2$ passing through the shaft P', and the nut $p'$, substantially as set forth.

10. A machine for simultaneously boring out the shaft bearings and armature space in a dynamo electric machine, consisting of a bed for supporting said dynamo, a boring bar adapted to pass through all the parts to be bored, adjustable bearings for said bar at each end of the bed, and means for rotating and feeding said bar, substantially as described.

11. A machine for the purpose hereinbefore set forth, consisting of a bed for supporting the work, a boring bar adapted to pass through all the parts to be bored, adjustable bearings for said bar, means for rotating said bar, means for feeding the bar in either direction, and means for instantly stopping the feed while the bar is rotating, substantially as set forth.

In testimony whereof I have hereto set my hand this 23d day of August, 1892.

JOHN RIDDELL.

Witnesses:
JOHN W. GIBBONEY,
BENJAMIN B. HULL.